United States Patent [19]

Davidson et al.

[11] Patent Number: 5,056,405
[45] Date of Patent: Oct. 15, 1991

[54] PROPELLANT-TO-INHIBITOR BONDING SYSTEM

[75] Inventors: Thomas F. Davidson, Manassas, Va.; Evester Sullivan, Washington, D.C.

[73] Assignee: The United States of America as represented by the Secretary of the Navy, Washington, D.C.

[21] Appl. No.: 621,256

[22] Filed: Nov. 30, 1990

[51] Int. Cl.$^5$ .............................................. F42G 3/00
[52] U.S. Cl. .................................. 86/20.14; 102/290; 102/473; 149/109.6; 264/3.1
[58] Field of Search ............... 102/290, 473; 86/20.14; 149/109.6; 264/3.1

[56] References Cited

U.S. PATENT DOCUMENTS

| 3,716,604 | 2/1973 | Dehm | 102/290 |
| 4,209,351 | 6/1980 | Pierce et al. | 102/290 |
| 4,304,185 | 12/1981 | Sayles | 102/290 |
| 4,429,634 | 2/1984 | Byrd et al. | 102/290 |
| 4,744,299 | 5/1988 | Sayles | 102/290 |
| 4,803,019 | 2/1989 | Graham et al. | 102/290 |

Primary Examiner—Stephen J. Lechert, Jr.
Attorney, Agent, or Firm—Kenneth L. Warsh; Robert M. Wohlfarth

[57] ABSTRACT

A solid propellant to inhibitor bonding system for use in replaceable propellant grain assemblies is used with an inhibitor sleeve that has one end attached to an end closure having interior insulation, made of the same rubber insulation material as the inhibitor, and forming a cylindrical cavity for receiving a poured propellant mix. The bonding system is employed prior to pouring the propellant mix. This bonding system involves cleaning the interior surface of the cavity with freon solvent and brush applying a barrier coat, comprising an epoxy resin with amine curing agents, to the interior surface of the cleaned inhibitor. The barrier coat is then cured and a liner is then brush coated onto the cured interior surface of the barrier coat. The liner is then cured and the propellant is then cast into the cavity formed by the lined inhibitor sleeve and insulated closure. It is important the the polymer and curing agent of the propellant and liner be the same to assure optimum compatibility and effective adhesive bonding. This is accomplished by providing common chemical constituents even though they are formed by different processes and have other different chemical constituents.

7 Claims, 5 Drawing Sheets

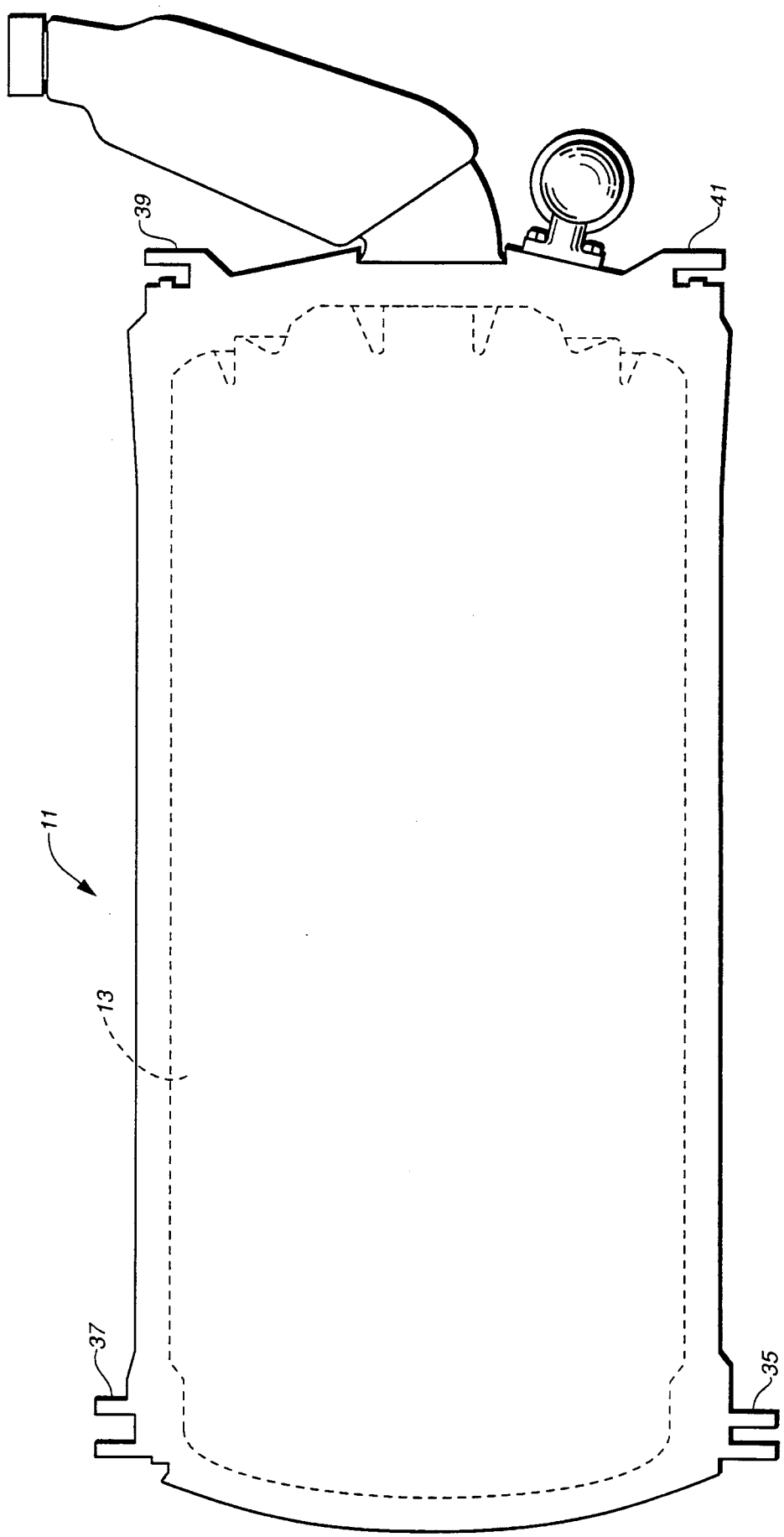
FIG._1

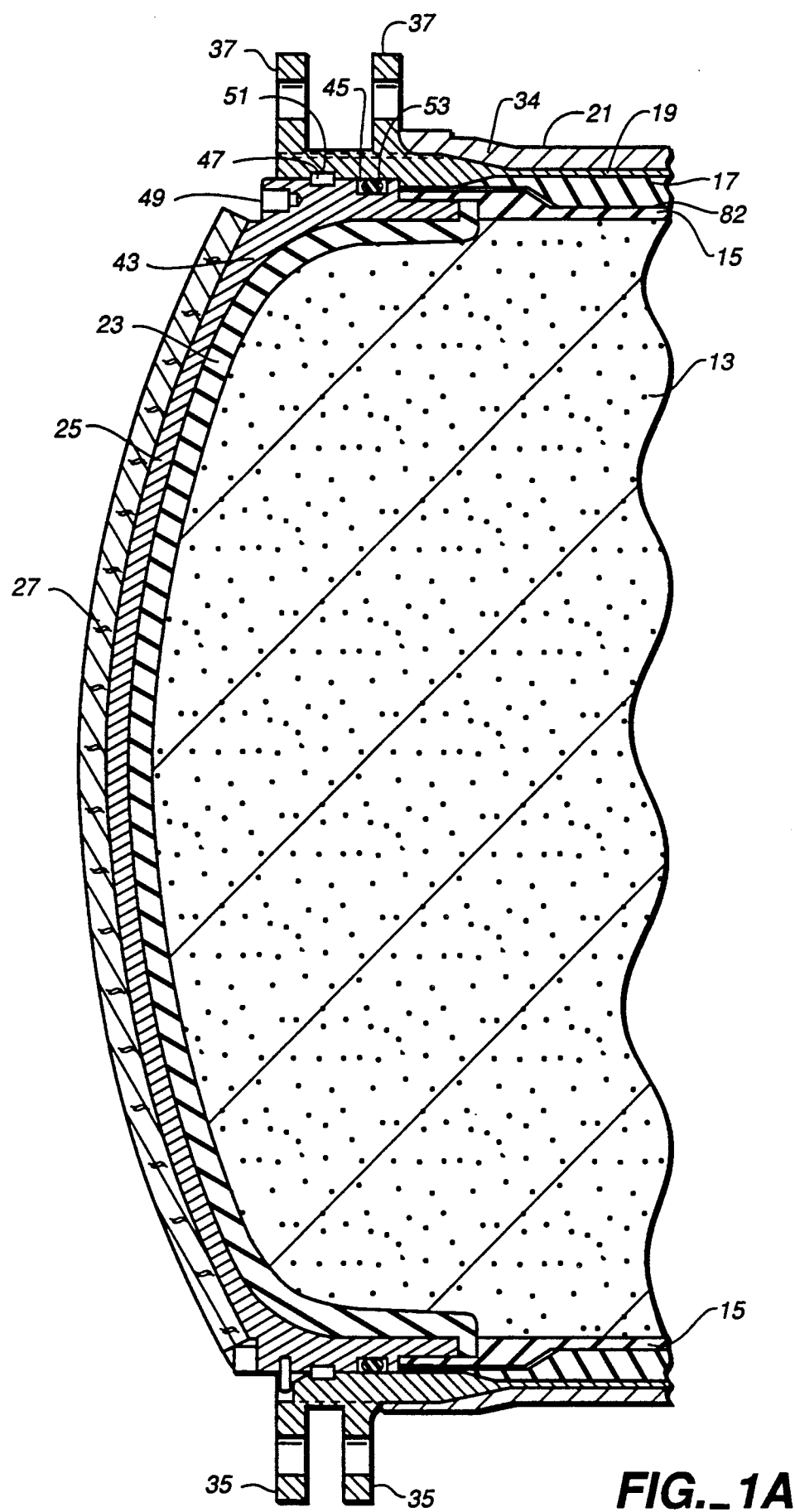
FIG._1A

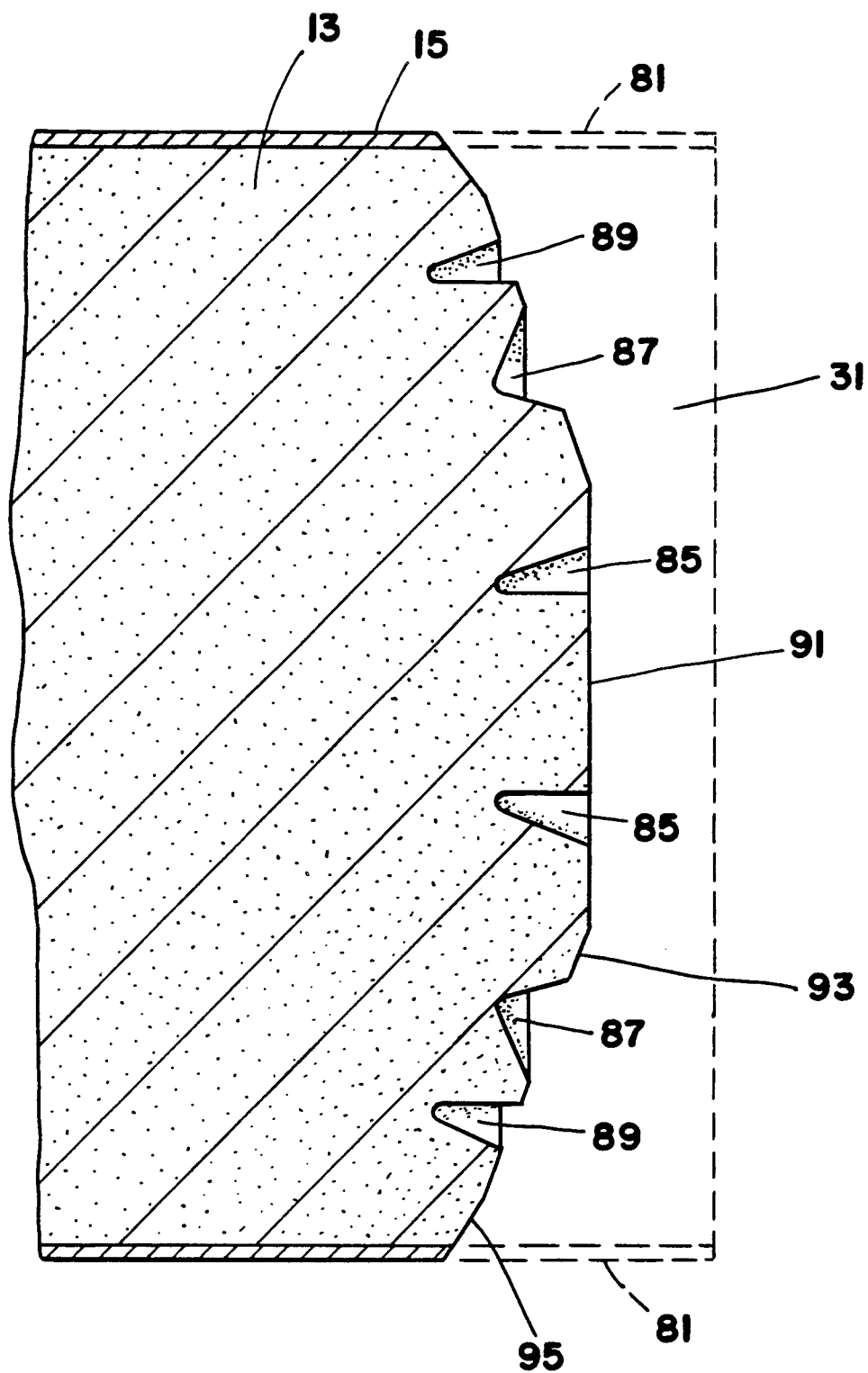
FIG_2

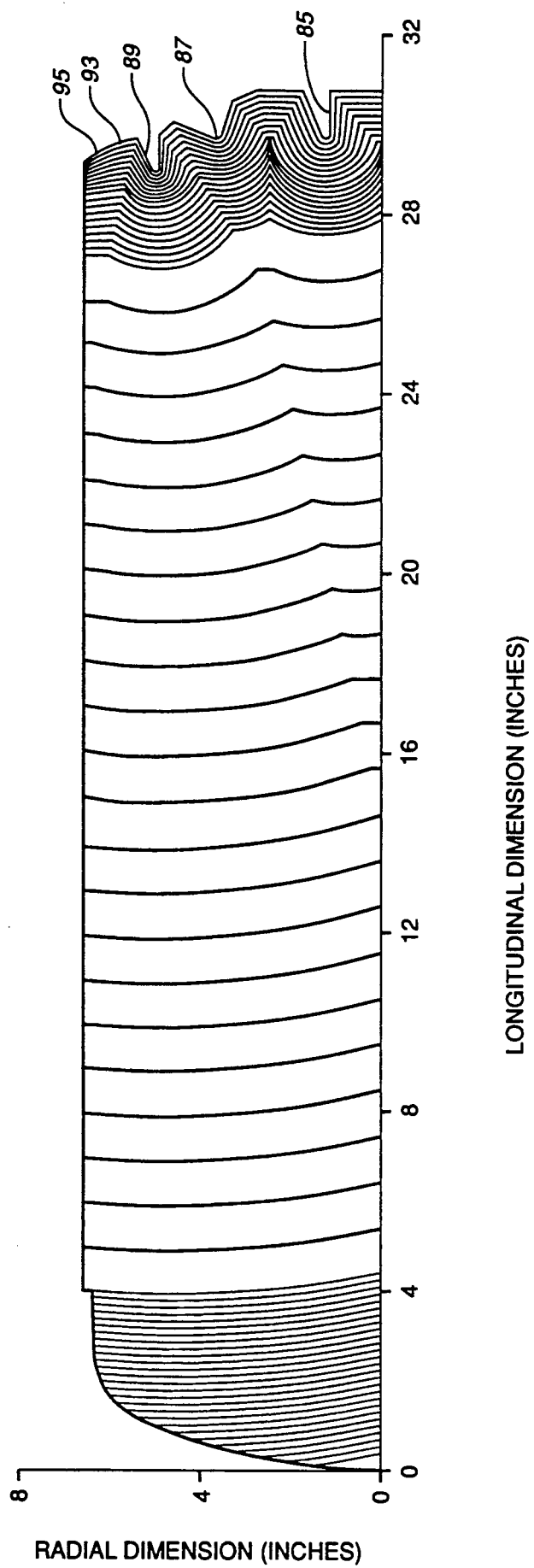
FIG._3

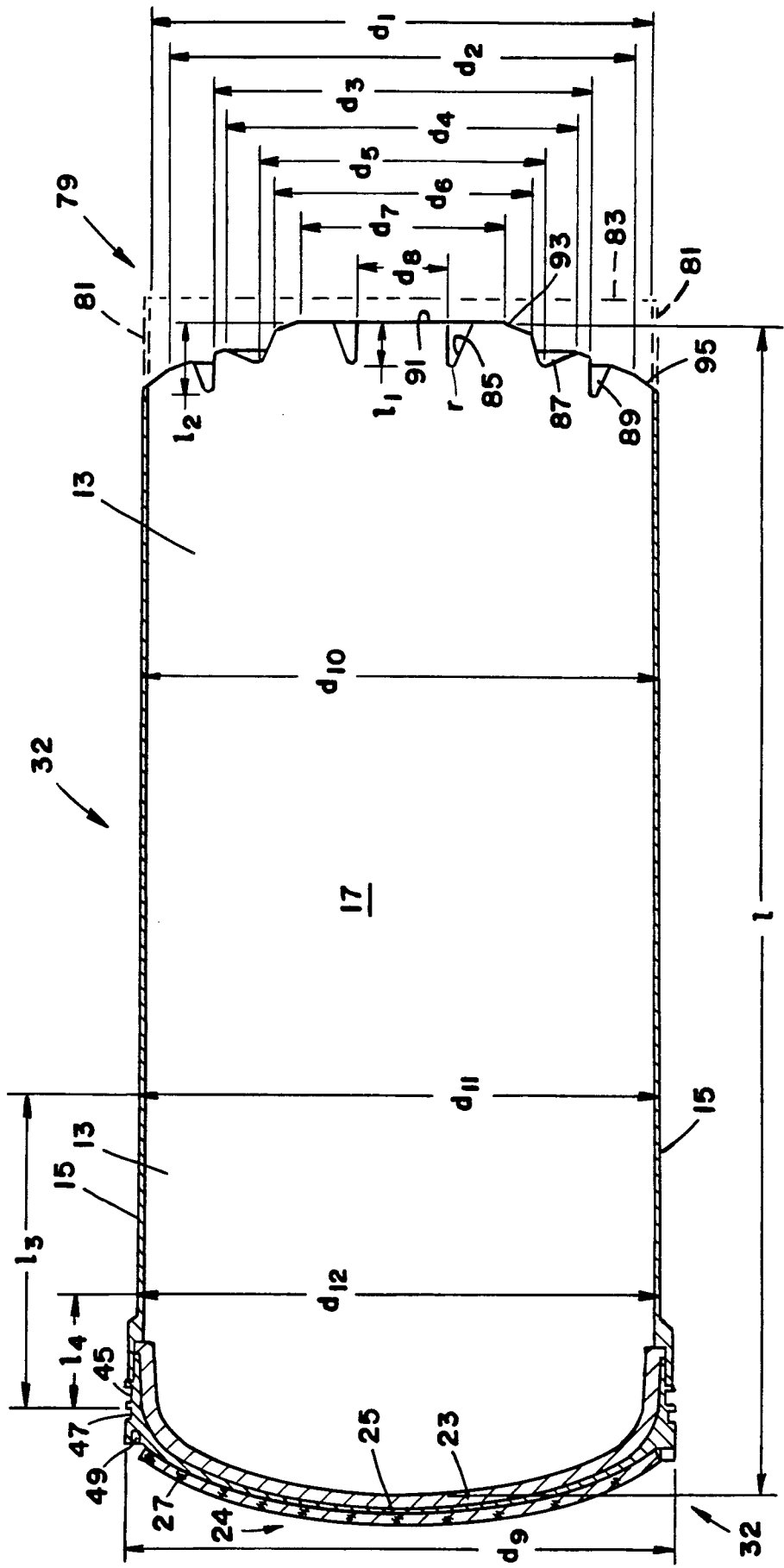
FIG_4

PROPELLANT-TO-INHIBITOR BONDING SYSTEM

FIELD OF THE INVENTION

The present invention relates to propellant systems and more particularly, but without limitation thereto, to a chemical bonding system for bonding a solid propellant to its inhibitor sleeve that may be used in gas generators for missile systems.

BACKGROUND OF THE INVENTION

Modern guided missiles need high performance gas generators for providing high pressure and temperature gases to control nozzles of post boost control systems and the like. This provides gas energy to achieve forward, reverse, pitch, yaw and roll thrust control of the missile equipment and re-entry body sections. Prior art techniques have not provided the high performance required for advanced weapon systems that must undergo severe operating environments and have longer term burn requirements for high pressure and temperature gases. Moreover, modern weapon systems often have long storage life requirements wherein propellants that have excessively aged, for example, may be easily replaced with a fresh propellant contained in an inhibitor sleeve that forms part of a replaceable propellant grain assembly. This requires repeatable close tolerances, long term dimensionable stability and inhibitor to propellant bonding that will withstand long duration, high temperature and pressure conditions. These and other requirements have been accomplished by the solid propellant to inhibitor bonding system of the present invention.

OBJECTS OF THE INVENTION

An object of the present invention is to provide a solid propellant to inhibitor bonding system for use in replaceable propellant grain assemblies.

A further object of the present invention is to provide a cost effective, efficient and reliable propellant to inhibitor chemical bonding system.

SUMMARY OF THE INVENTION

These and other objects have been demonstrated by the propellant to inhibitor bonding system of the present invention which is used with an inhibitor sleeve that has one end attached to an end closure having interior insulation, made of the same rubber insulation material as the inhibitor, and forming a cylindrical cavity for receiving a poured propellant mix. The bonding system of the present invention is employed prior to pouring the propellant mix. This bonding system involves cleaning the interior surface of the cavity with freon solvent and brush applying a barrier coat, comprising an epoxy resin with amine curing agents, to the interior surface of the cleaned inhibitor. The barrier coat is then cured and a liner is then brush coated onto the cured interior surface of the barrier coat. The liner is then cured and the propellant is then cast into the cavity formed by the lined inhibitor sleeve and insulated closure. It is important that the polymer and curing agent of the propellant and liner be the same to assure optimum compatibility, effective adhesion and bonding. This is accomplished by providing common chemical constituents even though they are formed by different processes and have other different chemical constituents. All of the above described characteristics have been achieved by the propellant to inhibitor bonding system of the present invention which will be described in detail with reference to the accompanying tables and drawings.

BRIEF DESCRIPTION OF THE DRAWINGS

FIG. 1 is an overall side elevation view of the gas generator assembly which employs the propellant to inhibitor bonding system of the present invention.

FIG. 1A is a sectional view of the forward section of FIG. 1.

FIG. 2 is a sectional-view of the aft end of the solid propellant grain assembly.

FIG. 3 is a burn-back pattern of the grain.

FIG. 4 is a cross-sectional view of the propellant grain assembly and the forward closure assembly.

GLOSSARY

The following is a glossary of elements and structural members as referenced and employed in the present invention.

- 11 gas generator
- 13 propellant grain
- 15 inhibitor
- 17 internal insulation
- 19 case
- 21 external insulation
- 23 internal insulation
- 25 forward closure
- 27 external insulation
- 29 gas outlet assembly
- 30 igniter
- 31 cylindrical cavity
- 34 thickened forward section of case 19
- 35, 37, 39, 41 attachment lugs
- 43 thickened section of forward enclosure 25
- 45 o-ring groove
- 47 annular retaining key groove
- 49 handling holes
- 51 retaining key
- 53 o-ring
- 79 exposed aft section of the grain
- 81 inhibitor after casting but before machining
- 82 interface between the exterior cylindrical surface of the inhibitor 15 and the internal insulation 17
- 83 position of surface of grain after casting but before machining
- 85, 87, 89 annular concentric grooves
- 91 flat face of grain
- 93, 95 chamferred faces of grain

DESCRIPTION OF THE PREFERRED EMBODIMENT

Referring now to the drawings wherein like reference numerals are used to designate like or corresponding parts throughout the various figures thereof, there is shown in FIG. 1 a side elevation sectional view of the gas generator assembly of the present invention as indicated by reference numeral 11. FIG. 1A shows a sectional view of the forward end of the generator of FIG. 1.

Gas generator 11 includes propellant grain 13, inhibitor 15, internal insulation 17, case 19, external insulation 21, gas outlet assembly 29, and igniter 30. The forward section shown in FIG. 1A includes internal insulation 23, forward closure case 25 and external insulation 27.

The propellant grain assembly 32 shown in FIG. 4 comprises cylindrical inhibitor 15, solid propellant grain 13 and forward closure 24, also shown in FIG. 1A. Forward closure assembly 24 includes forward closure 25, internal insulation 23 and external insulation 27 attached thereto.

Case 19 of is of cylindrical configuration with an integral aft dome section, a thickened forward section 34 as shown in FIG. 1A and attachment lugs 35, 37, 39, and 41. Forward closure 25 has a domed configuration, thickened section 43, o-ring groove 45, retaining key groove 47 and four handling holes 49. The forward closure is attached to the case with a retaining key 51 and is sealed by means of o-ring 53.

The propellant grain is made from a hydroxyl terminated polybutadiene polymer propellant with HMX solid particles used as an oxydizer (HTPB/HMX) composite propellant with flame temperature of about 3,000° F. The propellant weight is approximately 250 pounds and is a cast-in-sleeve configuration having a length of about 29 inches and a diameter of about 13 inches. The grain is an end burning design with a configured start up surface for added initial burn area and uniform flame front propagation.

Interface 82 between the exterior cylindrical surface of the inhibitor and the interior cylindrical surface of the gas generator, as shown in FIG. 1A, is an interference fit that requires maintaining a very close dimensional tolerance of the diameter of the inhibitor under severe mechanical and thermodynamic conditions. (An interference fit has no clearance.) This requires an extremely effective bond between the propellant 13 and inhibitor 15. In addition, during operation there is propellant burn-back from the aft end of the inhibitor. The peripheral end seal between the propellant and inhibitor is critical because a break in the seal will result in undesirable burning along the radial surface and not the end. This also requires an extremely effective bond between the propellant and inhibitor. An interference fit also maximizes propellant weight and assures mechanical integrity.

The propellant grain assembly is loaded and unloaded by cooling the grain assembly to provide necessary clearance between the inhibitor and insulator and then subjected to normal temperature conditions where the interface has an interference fit.

FIGS. 2 and 4, show propellant grain 13 and inhibitor 15 of propellant grain assembly 32. Between the grain 13 and inhibitor 15 and between the grain and the forward closure assembly 24 is an adhesive bonding system for interconnecting the grain, inhibitor and forward closure assembly. The method of manufacture is to pour the propellant and machine the exposed aft section 79 (see FIG. 2) after the propellant has been cured. This is accomplished by using an elongated inhibitor, as shown by dotted line 81 in FIGS. 2 and 5, and pouring the propellant into the assembly in the vertical position. The cavity is filled with propellant to the position shown by dotted line 83 and allowed to cure. The propellant and inhibitor are then machined as shown and described below.

System operation consists of meeting ignition characteristics and a flow rate range for a given pressure range dictated by missile requirements. This is accomplished by the unique design of the aft grain configuration which defines the initial burn area. From FIGS. 2 and 4, it can be seen that the grain includes annular concentric grooves 85, 87 and 89, flat section 91 and chamfer sections 93 and 95. The configuration of these grooves, flat section and chamfers along with the tapered grain diameter together define an initial burn area that results in appropriate burn progression. The design considerations include clearance for thermal expansion during storage and operation, clearance for the igniter diffuser mounted in the case, maximizing propellant weight, optimizing surface area progression, ease of manufacture, and a configuration that assures grain ignition and burn progression as shown in FIG. 3. Grooves 85, 87 and 89 provide the required additional initial surface area to overcome system heat losses and achieve proper initial operating pressures.

Table I shows the characteristics of the propellant grain 13 of FIG. 6 for a HTPB/HMX grain material, flame temperature 3,000° F., and grain weight 232 pounds.

TABLE I

| Grain dimensions (inches) | |
|---|---|
| $d_1$ | 13.0 |
| $d_2$ | 12.12–12.04 |
| $d_3$ | 9.82–9.78 |
| $d_4$ | 9.25–9.21 |
| $d_5$ | 7.42–7.38 |
| $d_6$ | 6.79–6.75 |
| $d_7$ | 5.44–5.36 |
| $d_8$ | 2.42–2.38 |
| $d_9$ | 14.25 |
| $d_{10}$ | 13.46–13.42 |
| $d_{11}$ | 13.60–13.56 |
| $d_{12}$ | 13.67–13.63 |
| r | 0.110–0.090 |
| l | 29.0 |
| $l_1$ | 1.16–1.13 |
| $l_2$ | 1.94–1.91 |
| $l_3$ | 8.29–8.27 |
| $l_4$ | 3.01–2.99 |

Slot 87 shown in FIG. 2 provides proper burn pattern and clearance for the diffuser of the igniter assembly under highest temperature storage conditions when the propellant grain expands in the longitudinal direction. The radial interface between the exterior surface of the inhibitor and the interior surface of the insulator is an interference fit having no clearance. This is done to maximize propellant weight and to eliminate separation of the inhibitor and the propellant grain. Elimination of this separation is critical to prevent propellant burnback in the interface between the grain surface and the inhibitor. The propellant grain assembly is loaded and unloaded by cooling the grain assembly to provide the necessary clearances between the inhibitor and insulator and then subjecting the propellant grain to normal temperature conditions which expands the grain to form an interference fit.

The forward closure assembly includes titanium forward closure 25, internal insulation 23 and external insulation 27. The forward closure assembly is attached to the forward end of inhibitor 15 by means of an epoxy adhesive, for example. Between the outer surface of the forward closure 25 and inner surface of inhibitor 15 and between forward end of closure 25 and the interior surface of interior insulation 23 is the epoxy adhesive bonding system of the present invention. Although performing different functions, inhibitor 15 and internal insulator 23 are made of the same rubber type material as defined below. The overall method of manufacture is to assemble the inhibitor 15 and forward closure assembly 17 to form a cylindrical cavity. The chemical bonding system materials are applied to the interior surfaces of the cavity and propellant is then poured into the cavity. This is accomplished by using an elongated inhibitor 81 and pouring the propellant into the vertically positioned cylindrical cavity 31 as shown in FIG. 2. The propellant and inhibitor interconnected by the bonding system of the present invention are then machined with concentric grooves 85, 87, 89 and surfaces 91, 93, and 95 as shown in FIG. 2.

The constituents and process of the propellant to inhibitor bonding system of the present invention are as follows:

(1) The above described inhibitor and forward closure assembly (which contains insulation 23 bonded to forward closure 25) are assembled and placed into casting tooling. The inhibitor 15 and interior insulation 21 are made of the same material and generally comprise an ethylene propylene, diene monomer (EPDM/neoprene rubber binders containing silica powder and aramid fibers.) The specific chemical composition is set forth in Tables II and III as follows:

TABLE II

(Chemical Composition)

By Weight Composition in Parts per 100 Parts of Rubber Binder (PHR)

| Function | Ingredient | Minimum | Maximum | Nominal |
| --- | --- | --- | --- | --- |
| Binder | EPDM Elastomer | 79.0 | 81.0 | 80.0 |
|  | 2 Chlorobutadiene 1,3 Elastomer | 19.0 | 21.0 | 20.0 |
| Filler | Silica Hydrate | 29.0 | 31.0 | 30.0 |
| Antioxidants | Polymerized Trimethyl Dihydroquinoline | 1.9 | 2.1 | 2.0 |
|  | Alkylated Diphenylamines and Diphenyl-P-Phenylendiamene | 0.9 | 1.1 | 1.0 |
| Curing Agent | 40% a,a' Bis (Tert-Butylperoxy) Diisopropylbenzene | 5.5 | 5.7 | 5.6 |
| Processing Aids | Napthenic Process Oil | 4.9 | 5.1 | 5.0 |
|  | Synthetic Polyterpene Resin | 4.9 | 5.1 | 5.0 |
| Fiber | Aramid Fiber (.25 inch) | 27.0 | 29.0 | 28.0 |
| Activator | Zinc Oxide, Technical | 4.9 | 5.1 | 5.0 |

TABLE III

(Functional Description of Ingredients)

| Ingredient | Description |
| --- | --- |
| EPDM Elastomer | EPDM elastomer; binder also adds chemical bond sites |
| 2 Chlorobutadiene 1,3 Elastomer | Choroprene elastomer added to improve processing and bonding |
| Silica Hydrate | Mineral filler to improve thermal properties (mixing and packing) |
| Polymerized Trimethylquinoline | Polymerized trimethylquinoline antioxidant prevents aging degradation of the polymer chain |
| Alkylated Diphenylamines and Diphenyl-p-Phenylendiamene | Diphenylamine; antioxidant used in combination with above for high temperature storage conditions |
| 40% a,a' Bis (Tert-Butylperoxy), Diisopropylbenzene (curative) | 40% active peroxide supported on Burgess KE clay; curative for both polymers also provides aging stability as compared to Sulfer, for example. |
| Napthenic Process Oil | Lubricating oil; improve mixing |
| Synthetic Polyterpene Resin | Tackifier added to improve green tack (adhesion between uncured layers) |
| Aramid Fiber (.25 inch) | Aramid fiber reinforcement; improved char retention and thermal properties |
| Zinc Oxide | Activator for curing agent |

The following are the process steps used to prepare the uncured thermal insulation and inhibitor composition.

(1) The initial batch includes mixing the binders, antioxidants, processing aids and catalyst. A Banbury mixer is used for approximately 2 minutes.

(a) The fiber filler is then mixed with the step (I) constituents. A Banbury mixer is used for three submixes each for approximately one minute.

(b) The curative is then mixed with the step (2) constituents. A Banbury mixer is used for approximately one minute to form a slab about 4 inches thick, one foot wide and from one to two feet long.

(c) The mixed slab of step (3) is then calendered to about 0.1 inch thick.

(d) The calendered material of step (4) is then remixed in a Banbury mixer for about one minute to form a mixed slab as defined in step (3).

(e) The mixed slab of step (5) is then calendered to about an 0.1 inch thick sheet having a 4 foot width.

(f) A thin plastic cover sheet is applied to one surface of the step (6) uncured insulation sheet and rolled for subsequent use.

(g) When used; the uncured insulation is cut to proper configuration; the configured insulation is laid up and the plastic sheet is removed. If additional insulation thickness is required another piece of uncured insulation is cut to proper configuration and laid up against the first uncured insulation sheet and the plastic sheet is removed. The first and second sheets are tacky and are pressed together to form contiguous insulation sheets.

The process is repeated until the total desired uncured insulation thickness is achieved.

(h) The uncured insulation of step (8) is then cured by subjecting it to elevated temperatures wherein the time and temperature is dependent upon the total thickness of uncured insulation. The inhibitor sleeve has a nominal thickness of about 150 mils, a length of about 30 inches and a diameter of about 13 inches.

(2) The inner surface of the cavity formed by inhibitor sleeve 15 and insulator 23 is cleaned with a methyl ethyl ketone (MEK) dampened lint free cloth and is then dried for at least 60 minutes.

(3) A barrier coat is then brush applied to the interior surface of the cleaned cavity. The barrier coat is an epoxy resin with amine curing agent, such as Scotchcast-8 TM (made by The Minnesota Mining and Manufacturing Co.). The barrier coat is brush applied to a nominal weight of about 0.35 pounds or about 3-4 mils thickness.

(4) The barrier coat is then cured wherein the cure time and temperature is 24 hours minimum at 60° to 90° F. plus 1 hour minimum at 170°±5° F.

(5) A liner is then brush coated onto the cured interior surface of the barrier coat. The inhibitor sleeve and forward closure are preheated to 170° F. for 2 to 6 hours prior to liner application. The liner is applied in two brush coats and has a final nominal weight of about 0.25 pounds or 2-3 mils. thickness. The chemical composition of the liner is carbon black, isophorone diisocyanate liquid, polybutadiene liquid hydroxyl terminated (type II), and ferric acetylacetonate. The mixing process of the uncured liner material is as follows:

(a) Add polybutadiene liquid hydroxyl terminated (type II) and ferric acetylacetonate to mixer and blend 1 hour minimum at low speed with mix temperature 160°±10° F. Cool to 90°±10° F. before further processing.

(b) Add isophorone diisocyanate and blend 10 minutes minimum at low speed.

(c) Screen carbon black through a 100 mesh screen using Ro-Tap with approximately 5 mm diameter glass beads. Add approximately ⅓ of the carbon black to mix and blend for 10 minutes minimum at low mixer speed. Repeat mixing step for each of the two remaining portions of carbon black.

(d) When all ingredients have been added and mixed, run mixer at low speed for 60 minutes minimum under vacuum of 25 inches of mercury minimum. Mix temperature shall not exceed 90° F. Break vacuum with nitrogen or argon.

(e) Clean storage cans and lids with solvent and allow to air dry. Transfer mix to 1 quart can, and 1 pint can. Purge cans with nitrogen or argon before filling. After filling, flush with nitrogen or argon before installing lids.

(f) Store in deep freeze at 0°±10° F. for one (1) year.

(6) The liner is then cured for a total time of 72 to 96 hours at a temperature of 170° F.±5° F. If propellant casting operations are not to begin immediately purge with nitrogen and seal. The lined assembly may be stored up to 2 weeks maximum before casting at 60° to 90° F.

(7) The propellant is manufactured and then cast into the lined cavity. The propellant materials are cyclotetramethylenetetranitramine, i.e, HMX (class I), carbon black, isophorone diisocyanate, and polybutadiene liquid hydroxyl terminated (type II).

(a) The mixing process of the uncured propellant begins by adding the polybutadiene liquid hydroxyl terminated (type II) and the carbon black to mixer. The carbon black shall be added within 4 hours maximum of removal from "in use" storage. Blend the ingredients for 5 minutes at atmospheric pressure and then under vacuum for 15 minutes at a minimum vacuum of 28 inches of mercury. The vacuum shall be broken with nitrogen. While mixing, add ground Class 1 HMX utilizing a vibrating feeder. This mixing shall be for a minimum of 40 minutes at atmospheric pressure. While mixing, add the unground Class 1 HMX utilizing a vibrating feeder. This mixing shall be for a minimum of 45 minutes at atmospheric pressure followed by blending for a minimum of 1 hour at a minimum vacuum of 28 inches mercury. Vacuum shall be broken with nitrogen.

(b) Remove sample for moisture analysis and total solids test.

(c) Add IPDI, mix 10 to 12 minutes, at atmospheric pressure. Blend under vacuum at a minimum vacuum of 28 inches of mercury for 90 minutes. During the final mixing, the mixer shall be run at its slowest speed and the water jacket temperature adjusted to yield a final mix temperature of 140°±5° F. Break vacuum with nitrogen. The propellant shall be cast within 10 hours maximum upon completion of mixing.

(d) The casting process of the uncured propellant begins by preheating the casting hardware assembly 2 to 6 hours at 170°±10° F. prior to casting if not already hot from the liner cure.

(e) The hopper shall be loaded with propellant and replenished as necessary during casting. The hopper water jacket temperature is maintained at 140°±10° F. and relative humidity is maintained at 30 to 60% during casting.

(f) Evacuate the inhibitor sleeve/closure assembly to a pressure of not less than 5 mm of mercury. Close off vacuum line to inside of inhibitor sleeve, but maintain vacuum on outside of inhibitor sleeve to prevent sleeve from collapsing during casting. Open hopper valve to allow propellant to flow into inhibitor sleeve, allowing pressure in the sleeve to be not more than 20 mm of mercury until the propellant level is approximately 1 inch from bottom of casting tooling "clamp" ring, discontinue breaking vacuum and add propellant to obtain correct height of maximum of 2 inches from bottom of "clamp" ring. Close hopper valve and break vacuum. Remove casting hopper and measure propellant level. If insufficient propellant, replace casting hopper, evacuate the sleeve to a pressure of not more than 120 mm of mercury and cast additional propellant. Release vacuum on inside of sleeve first, then release vacuum on outside of sleeve.

(g) The propellant is then cured, thereby bonding the propellant to liner inhibitor 15, by sealing the end of the casting cylinder and applying nitrogen gas at a pressure of 40±5 psig for the first 60 hours minimum of cure. The propellant shall be cured for a total time of 140 to 164 hours at 170° F.±5° F. Total deviations from propellant cure temperature totaling one hour are permitted provided that the excursion temperatures are greater then 40° F. and less than 200° F. Total deviations in excess of one hour and less than 12 hours are permitted provided the excursion temperatures are greater than 130° F. and less than 90° F. The total propellant cure time is to be extended by the total time of propellant cure temperature excursion below 165° F.

(h) The nitrogen gas shall be released and the grain assembly allowed to cool 1 hour minimum after cure.

After the above described manufacturing and curing process the assembly is then machined as previously described and as shown in the FIG. 4.

Because of the severe temperature, time, pressure and load conditions put on a gas generator of the type described it is critical that the metal case to non-metal bonding system be effective under adverse conditions. The present invention provides such a bonding system the details of which are as follows:

(1) The titanium case (6AL-4V) is sandblasted with a 180 grit aluminum oxide abrasive to a surface roughness not to exceed 125 microinches.

(2) The interior sandblasted surface is then cleaned by using a lint free cloth dampened in methyl ethyl ketone (MEK) solvent.

(3) A corrosion resistant coating, such as Chemlok 205 ™ (rubber to metal adhesive primer made by Lord Chemical Products), is then applied by brush application and having a nominal thickness of 1-2 mils. Chemlok 205 ™, for example, is a chlorinated resin and phenolic blend in 79% solvent with 5% titanium dioxide and 1% zinc oxide.

(4) The Corrosion resistant coating is then air dried at ambient temperature and atmosphere for at least 60 minutes.

(5) A metal to rubber adhesive coating, such as Chemlock 252 ™, is then applied by brush application and leaving a nominal thickness of 1-2 mils. Chemlock 252 ™, for example, is a chlorinated resin with EPDM rubber curing agent.

(6) The adhesive coating is then air dried at ambient temperature and atmosphere for at least 60 minutes.

(7) Uncured insulation material is then laid up against the interior surface of the air dried adhesive coating. Several layers are used until the desired insulation characteristics (defined by thickness or weight) are achieved. Each layer adheres to the next since the uncured material is tacky. Between each layer a vacuum bag is inserted and a vacuum is pulled between the bag and the insulation material to attach adjacent layers of material. The insulation material preferable has plastic backing for storage and handling purposes.

A specific example of the lay-up process for the sheets of uncured insulation is as follows:

1. For the metal aft dome insulation cut five patterns, four patterns of approximately 0.100 inch thick and 1 additional pattern (thickness as required of insulating material). Pattern sizes are nominal in inches as follows:

TABLE IV

| Pattern | OD | ID | Thickness |
| --- | --- | --- | --- |
| 1 | 14.60 | 2.670 | .100 |
| 2 | 14.60 | 2.425 | .100 |
| 3 | 14.70 | 2.290 | .100 |
| 4 | 14.75 | 2.155 | .100 |
| 5 | 14.80 | 2.030 | As required |

2. For the metal case insulation cut five patterns of approximately 0.100 inch thick insulating material. Pattern sizes are nominal in inches as follows:

TABLE V

| Pattern | Width | Length Bottom | Length Top |
| --- | --- | --- | --- |
| 1 | 26 13/16 | 45¼ | 45¼ |
| 2 | 25 | 45 | 44 11/16 |
| 4 | 25½ | 43¼ | 43¾ |
| 5 | 6½ | 42¼ | 42½ |

The grain direction of the insulation material shall run axially with the motor case.

3. Lay dome patterns on table and clean top side with MEK and allow to air dry 10 minutes minimum.

4. Place patterns 1 and 2 clean sides mating into a dome preform fixture. Leave plastic backing on the outsides.

5. Place patterns 3 and 4 in similar condition. Remove plastic backing from outside of pattern 4 and clean with MEK. Allow to air dry 10 minutes minimum. Place pattern 5, clean, unprotected side on pattern 4. Leave plastic backing on outsides of patterns 3 and 5. Place patterns into a dome preform fixture.

6. Place mold assembly into a press and pressurize to 5-8 tons for 5-8 minutes minimum. Allow insulating material to stay in mold until needed.

7. Remove dome insulation from fixture. Remove the plastic backing and clean with MEK. Allow to air dry 10 minutes minimum.

8. Place pattern into the case first, locating the edge the distance from case retaining key groove. Smooth the pattern against the inside of case. Wipe the pattern surface with MEK and allow to air dry 10 minutes minimum. Filtered circulating air is to be used for approximately 2 minutes.

9. Install conventional cure ring in case. Install an oven film bag and fasten to cure ring with vacuum sealer or equivalent. Attach vacuum lines to fittings on cure ring and elbow connector and pull vacuum (24 inch Hg) for 10 minutes minimum.

10. Remove cure ring, oven film bag and vacuum lines. Cure ring may be left in place.

11. Install two ply dome insulation piece into case. Align insulation hole with entrance to outlet.

12. Pull vacuum per Steps 9 and 10.

13. Install remaining dome insulation piece into case per steps 11 and 12.

14. Install remaining patterns individually per steps 9 and 10.

15. Using new O-rings, install case cure ring into end of case and install conventional retaining key cure plug. Place teflon glass fabric on dome and side wall full length. Install cure bag into gas generator case. Secure cure bag to cure ring with rubber strip and hose clamp. Remove gas generator case assembly from handling fixture and place on cart and secure. Install ortman key plug and apply vacuum sealer or equivalent to all sealing areas of case.

16. Pull vacuum of 24 inches Hg for 30 minutes minimum. Ensure that cure bag has all the wrinkles out, is seated correctly and there are no leaks. This step may be performed after installation into an autoclave but prior to the start of the heating of the autoclave.

17. Move case to the autoclave. Place gas generator case on cure cart and install in autoclave.

18. The insulation, adhesive and casing are now cured which results in a bonding between the case and insulation. A specific example of the autoclave curing process is as follows:

(a) Attach vacuum line from pump to vacuum fitting on case outlet.

(b) With assembly under a vacuum of 24 inches of mercury minimum, start heating autoclave to 160° F.±10° F. and maintain for 2.0-3.0 hours at temperature.

(c) Start air compressor and pressurize assembly to 125-145 psig and increase the temperature to 195° F.±10° F. Maintain temperature and pressure for 1.5-2.0 hours.

(d) Increase autoclave temperature to 325° F.±10° F. and maintain for 3.5-4.0 hours. NOTE: Any deviation from the required temperature tolerance of 10° F. or less for a total of 15 minutes or less will be acceptable as long as the actual cure time to the required temperature is within the required cure time tolerance except when the temperature deviates above the temperature requirement.

(e) Maintain 125-145 psig until autoclave temperature reaches 150° F. This cool down period shall not be less than 30 minutes.

(f) Release pressure, remove assembly from autoclave and allow to cool to ambient.

(g) Remove all fittings, cure bag, and glass fabric from gas generator case. Clean case as necessary using MEK.

19. After the completion of step 18 the interior surface is machined to final dimensions for receiving the propellant grain assembly.

This invention has been described in detail with particular reference to a certain preferred embodiment, but it will be understood that variations and modifications can be effected within the spirit and scope of the invention.

What is claimed is:

1. A propellant to inhibitor/insulator bonding system for applying said bonding system to the interior surface of a cavity wherein said interior surface includes said inhibitor and insulator which are made of the same material comprising the steps of:
   (a) cleaning said cavity surface with a solvent;
   (b) applying a barrier coat to said cavity surface;
   (c) curing said barrier coat;
   (d) applying a liner coat to the cured barrier coat;
   (e) curing said a liner coat;
   (f) casting an uncured propellant into said cavity and against said cured liner coat;
   (g) curing said uncured propellant; wherein
   (h) said propellant is adhered to said cavity surface by said barrier
   and liner coats.

2. The bonding system of claim 1 wherein said solvent of step (a) is freon, and said barrier coat of step (b) is an epoxy resin with amino curing agents that is brush applied to about 3 to 4 mils thickness.

3. The bonding system of claim 2 wherein said barrier coat is cured for 24 hours minimum at 60° to 90° F. plus 4 hours minimum at 170°±5° F.

4. The bonding system of claim 3 wherein said liner coat of step (d) comprises the ingredients carbon black, liquid isophorone diisocyante, liquid polybutadiene hydroxyl terminated, (type II), and ferric acetylacetanate.

5. The bonding system of claim 4 wherein the step (e) curing of said liner is for a total time of 72 to 96 hours at a temperature of 170° F. to 5° F.

6. The bonding system of claim 5 wherein said uncured propellant of step (f) comprises the ingredients cyclotetramethylaminetetranitramine (Class I), carbon black, isophorone diisocyante and liquid polybutadiene hydroxyl terminated, type II.

7. The bonding system of claim 6 wherein the step (g) curing of said propellant is for a total time of 140 to 164 hours at 170° F.±5° F. in a nitrogen gas atmosphere of 40±5 psig for the first 60 hours minimum.

* * * * *